United States Patent [19]

Edwards et al.

[11] Patent Number: 4,538,860
[45] Date of Patent: Sep. 3, 1985

[54] WEAR RESISTANT WHEEL FOR TRACK LAYING VEHICLE

[75] Inventors: Michael F. Edwards, Wolverhampton; John Barlow, Willenhall; Frederick A. Foreman, Wolverhampton; Gwynne Williams, Edgemond, Nr. Newport, all of England

[73] Assignee: GKN Technology Limited, Wolverhampton, England

[21] Appl. No.: 524,016

[22] Filed: Aug. 16, 1983

Related U.S. Application Data

[63] Continuation-in-part of Ser. No. 240,956, Mar. 5, 1981, abandoned.

[51] Int. Cl.³ .............................................. B62D 55/08
[52] U.S. Cl. ...................................... 305/56; 474/901; 301/63 DS
[58] Field of Search ......... 305/57, 56, 36 WP, 63 DS, 305/63 DD, 63 PW, 65; 474/901

[56] References Cited

U.S. PATENT DOCUMENTS 3,606,497  9/1971  Gilles ..................................... 305/56
4,349,234  9/1982  Hartmann ............................. 305/56

FOREIGN PATENT DOCUMENTS 1939240  2/1971  Fed. Rep. of Germany ........ 305/56
2541776  3/1977  Fed. Rep. of Germany ........ 305/56
1939239  9/1977  Fed. Rep. of Germany ........ 305/56

Primary Examiner—David A. Scherbel
Assistant Examiner—Mark J. Abate
Attorney, Agent, or Firm—Marshall, O'Toole, Gerstein, Murray & Bicknell

[57] ABSTRACT

An aluminum or aluminum alloy wheel is disclosed for use in a back-to-back support wheel assembly in a track laying vehicle. Studs are embedded in the wheel rim edges 30 to reduce wear at the point of contact by the horns 34 of the track 36.

4 Claims, 16 Drawing Figures

WEAR RESISTANT WHEEL FOR TRACK LAYING VEHICLE

This application is a continuation-in-part of USA application serial no. 240,956 filed Mar. 5, 1981, now abandon.

BACKGROUND OF THE INVENTION

This invention relates to the manufacture of articles by the technique known variously as squeeze forming, squeeze casting or extrusion casting which, for the sake of convenience, throughout this specification the claims will be referred to as "squeeze forming". Basically the technique of squeeze forming comprises introducing liquid metal into a first part of a mould, closing the mould under pressure so that the liquid metal is displaced by the mould closure to fill a cavity within the mould without entrapping air, maintaining the metal under pressure whilst solidification takes place so as to ensure that any shrinkage cavities which may form are closed and filled, and then opening the mould and removing the formed article.

Metals most conveniently employed to produce squeeze formed articles are aluminium and aluminium alloys and although such squeeze formed aluminium or aluminium alloy articles are of sound metallurgical structure and strength, they can sometimes be subject to unacceptably severe wear conditions. For example, a support wheel for a track-laying vehicle of the type described in European Patent Application 79,300,842.6 (published as No. 0,005,937) is produceable by squeeze forming in aluminium or aluminium alloy but that part of the wheel which is engaged by the steel horns of the track is subject to extreme wear conditions.

It will be understood that many differing squeeze formed articles can be subject to severe wear conditions, and it is an object of the present invention to provide a squeeze formed article, and method of producing such article, wherein wear-resistant means are incorporated.

SUMMARY

In accordance with one aspect of the invention there is provided a method of manufacturing a metal article by squeeze forming characterised by the steps of locating a set of hard metal wear-resistant elements in a mould at a position corresponding to the position at which it is desired to produce a wear-resistant area in the formed article, the hardness of the metal elements being greater than the hardness of the metal being formed; introducing molten metal into the mould; closing the mould under pressure so that the molten metal is displaced by the mould closure to fill a cavity in the mould within which the hard metal elements are located; maintaining the metal under pressure whilst solidification thereof takes place and the hard metal elements become embedded therein, and opening of mould and extracting the formed article.

Conveniently the hard metal elements are initially located in a first part of the mould which provides at least part of the die cavity whereby, when the molten metal is introduced to said first part of the mould and the mould is closed under pressure, the metal is displaced to fill the cavity and to flow on to and around the hard metal elements.

Alternatively the hard metal elements may be initially located in that part of the die cavity wherein the molten metal is introduced so that the liquid metal flows at least partially on to and around the hard metal elements before the mould is closed under pressure and the metal is displaced to fill the cavity.

As a further alternative the hard metal elements may be releasably carried by a second part of the mould providing part of the die cavity which is brought towards said first part of the mould when the mould is closed under pressure, the molten metal then being displaced to fill the cavity and to flow on to and around the hard metal elements.

In accordance with a further aspect of the invention there is provided a squeeze formed metal article having a plurality of hard metal wear-resistant elements embedded therein during the forming operation, the hardness of said elements being greater than the hardness of the metal of the article.

The metal to be formed is a light metal such as magnesium or aluminium or an alloy thereof and the hard metal elements are conveniently formed of hardened steel; the metal being formed having a hardness within the range 60–200 VPN and the hard metal elements having a hardness within the range 350–1000 VPN.

Conveniently the hard metal elements comprise a set of spaced apart metal studs carried on a support member which may be a flexible member for enabling it and the studs carried thereon to be located in the mould or may be a rigid member configured to be positively located in the mould.

The article may comprise a one piece support wheel for a track laying vehicle comprising a disc and a rim, the disc being of dished configuration with the centre part of the disc extending axially of the wheel beyond one of the edges of the rim, and the set of hard metal elements being embedded in said rim edge for resisting wear imparted thereto by the horns of a track supported by said wheel. It will be appreciated that, in a track laying vehicle, a pair of such wheels would be arranged to be secured together in back-to-back configuration so that a continuous circumferential groove is provided between each pair of wheels into which the track horns project to guide the movement of the track beneath the wheels.

BRIEF DESCRIPTION OF THE DRAWINGS

Other features of the invention will become apparent from the following description given herein solely by way of example with reference to the accompanying drawings wherein.

DESCRIPTION OF PREFERRED EMBODIMENTS

Figure 1:
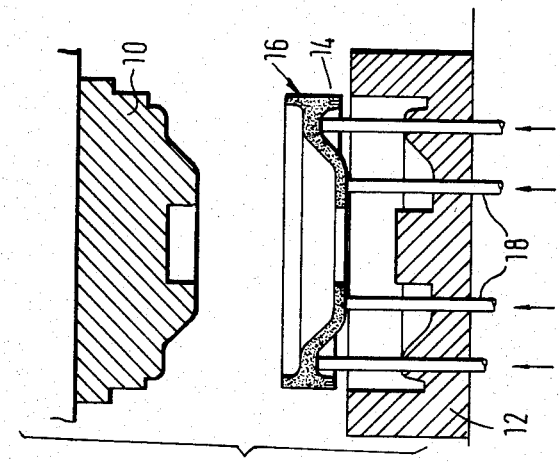
FIGS. 1 to 3 show sectional diagrammatic views of three steps in the sequence of squeeze forming a metal wheel wherein a set of hard metal studs are incorporated around the rim of the wheel

Referring to FIG. 1 of the drawings there is illustrated a mould having an upper mould part 10 and a lower mould part 12 configured to provide, when closed together, a die cavity in the shape of a wheel. The wheel is produced by the squeeze forming technique out of an aluminium or aluminium alloy material which is introduced in molten liquid form (by means of a suitable inlet nozzle) to that part of the die cavity provided in the lower mould portion.

Figure 2:
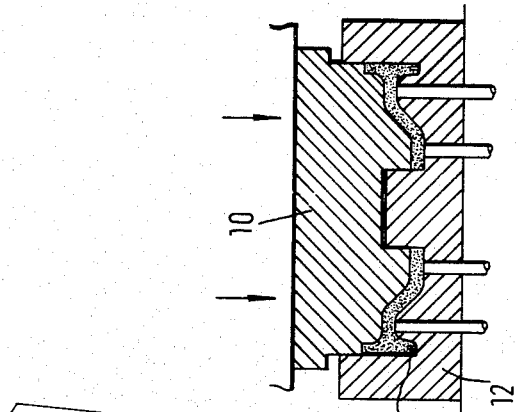

To provide a wear-resistant surface to the rim of the wheel, a set of a hard metal wear resistant elements 14 is located in the die cavity in the lower mould part 12 at a position corresponding to that which will provide, in the formed article, the rim thereof. Thus, referring to FIG. 1, a ring of cylindrical steel studs on a support member is located around the periphery of the die cavity in the lower mould part 12 before the liquid aluminium or aluminium alloy is introduced to the mould. After a predetermined quantity of liquid metal has been introduced to the die cavity the mould is closed by downward movement of the upper mould part 10. Such closure of the mould under pressure forces the liquid metal within the die cavity to flow radially outwardly and upwardly of the cavity defined between the upper and lower mould parts 10 and 12 whereby the liquid metal also flows on to and around the stud set 14 as is clearly shown in FIG. 2.

The mould is held closed under pressure whilst solidification of the metal takes place so as to ensure that any shrinkage cavities which may form are closed and filled and during which time the stud set 14 becomes embedded in the metal. After a predetermined time the upper mould part 10 is withdrawn upwardly away from the lower mould portion, as shown in FIG. 3, and the formed wheel 16 is ejected from the die cavity by means of suitable ejector rods 18.

Figure 3:
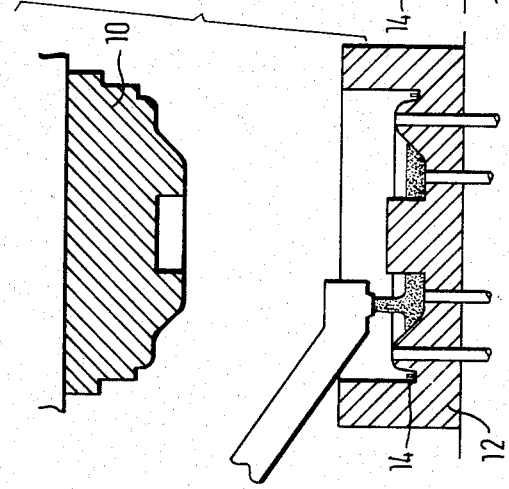
Figure 4:
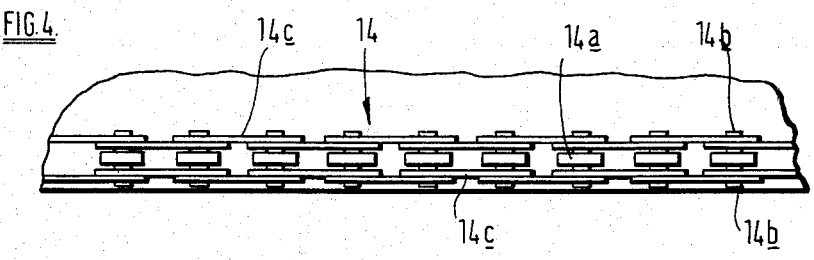
FIG. 4 is a top plan view of a set of hard metal studs in a roller chain arranged at the wheel rim edge
Figure 5:
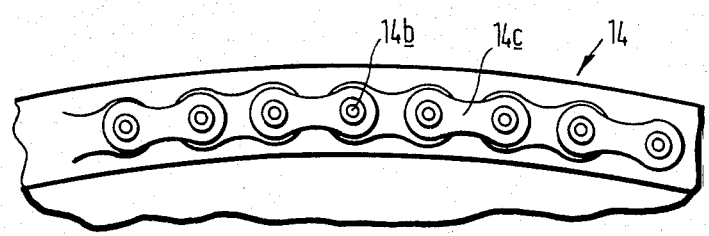
FIG. 5 is a side view of the roller chain studs of FIG. 4

Referring to FIG. 3, it will be seen that the squeeze formed wheel 16 is thus provided with the wear-resistant stud set 14 around the lower edge of its rim and such a wheel is conveniently used as part of a back-to-back support wheel arrangement for the track of a track-laying vehicle substantially of the type described and illustrated in European Patent Application No. 79 300 842.6 (published as No. 0005937).

Referring now to FIGS. 4 to 13 there will be described various alternative forms of stud sets 14 suitable for location in the mould as hereinbefore described for providing a wear resistant surface to the edge of a wheel rim. In all of these embodiments the actual wear resistance is afforded by a set of cylindrical hardened steel studs conveniently having a hardness within the range 350–1000 VPN as compared with the hardness of the aluminium forming the wheel itself which has a hardness within the range 60–200 VPN. Thus referring to FIGS. 4 and 5, the studs 14a are provided in a roller chain assembly, each stud having a spigot 14b projecting from either side of the stud and the spigots being connected to adjacent studs by means of plate-like support links 14c to provide a completely flexible assembly. Thus a single length of such a roller chain, or a plurality of lengths thereof, can be arranged in the mould prior to the introduction of molten aluminium for the squeeze forming operation.

Figure 6:
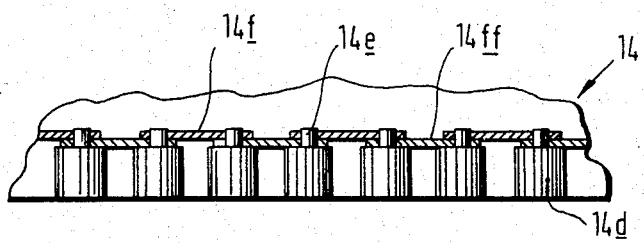
FIG. 6 is a top plan view of an alternative hard metal stud set
Figure 7:
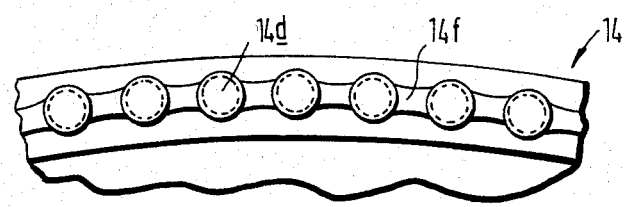
FIG. 7 is a side view of the stud set shown in FIG. 6

FIGS. 6 and 7 show an alternative form of flexible stud set assembly 14 wherein a set of cylindrical studs 14d are each provided with a spigot 14e at the rear face only and are interconnected by means of plate-like support links 14f having a force fit on the spigots and links 14ff having a free fit on the spigots. Again a single length of such an assembly, or plurality of individual lengths, can be located in the mould prior to the introduction of the molten aluminium.

Figure 8:
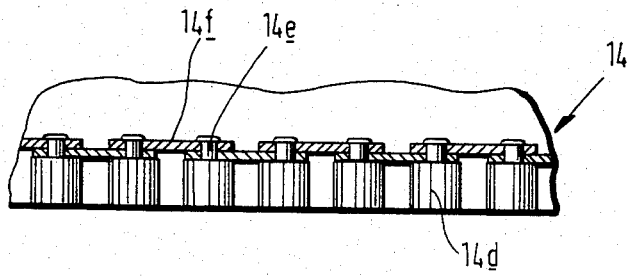
FIG. 8 is a top plan view of a further alternative hard metal stud set
Figure 9:
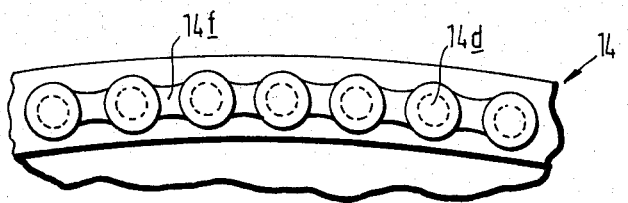
FIG. 9 is a side view of the stud set shown in FIG. 8

FIGS. 8 and 9 show a very similar stud set arrangement 14 to that shown in FIGS. 6 and 7 with the exception that the rear ends of the spigots 14e of the studs 14d are upset whereby the studs are rivetted to the support links to provide a flexible assembly for location in the mould.

Figure 10:
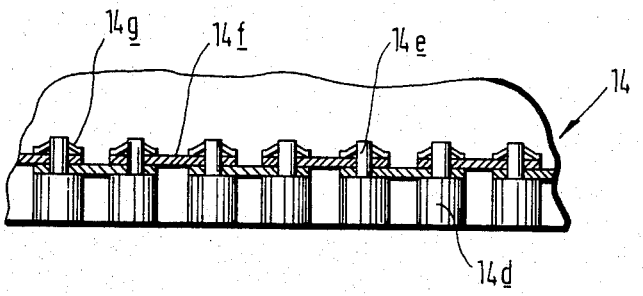
FIG. 10 is a top plan view of a still further alternative arrangement of stud set
Figure 11:
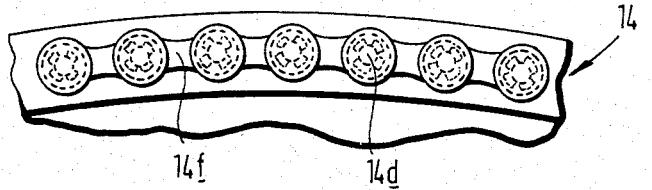
FIG. 11 is a side view of the stud set of FIG. 10

FIGS. 10 and 11 show a yet further variation wherein the studs 14d are retained on the support links 14f by means of a star washer 14g engaging over each spigot 14e with a friction fit.

Figure 12:
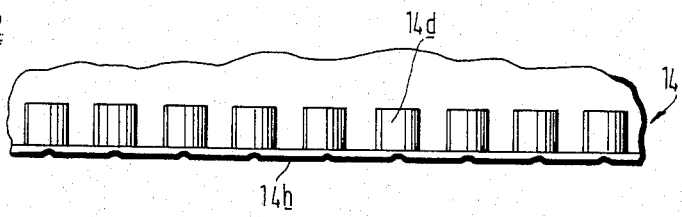
FIG. 12 is a top plan view of a yet further arrangement of stud set
Figure 13:
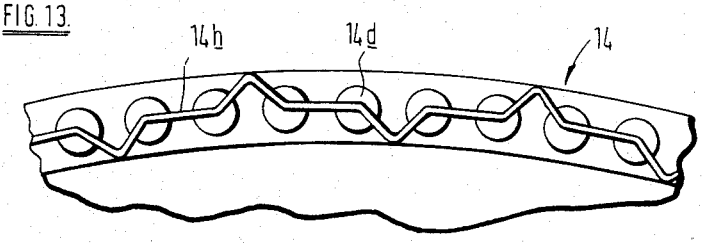
FIG. 13 is a side view of the stud set of FIG. 12

FIGS. 12 and 13 show an arrangement wherein a plurality of studs 14d are each spot welded at their rear face to a single steel wire 14h which, as will be clearly seen from FIG. 13, is of convoluted shape. This convoluted shape of the support wire enables the stud set 14 to be located more positively in the mould whereby there is less likelihood of its position being disturbed during the squeeze forming operation prior to solidification of the molten aluminium.

Each stud of the stud set 14 in the arrangement of FIGS. 12 and 13 is formed from a through-hardened steel to SAE 51100/52100 specification and is of cylindrical form with radiused ends, the provision of which lowers the stresses in the stud. Such a steel stud has good weldability, good wear resistance and good impact resistance to the conditions encountered in use and is further described herein.

It will be appreciated that, in all of the arrangements shown in FIGS. 4 to 13, the actual stud length may be varied as between adjacent studs to provide for the possibility of differential wear life at the wheel rim edge. Thus, after the wheel has been formed, some of the studs may be visible at the rim edge surface whilst other studs may be totally embedded within the aluminium and be located beneath the rim edge surface. However in all of the variations in design of the stud assembly, it will be appreciated that, after the wheel has been formed, the studs will be effectively mechanically locked into the wheel rim edge due to the penetration of the molten aluminium around the studs and support members during the forming operation. Furthermore an intermetallic bond will be established between the steel studs, the support member and the aluminium.

Figure 15:
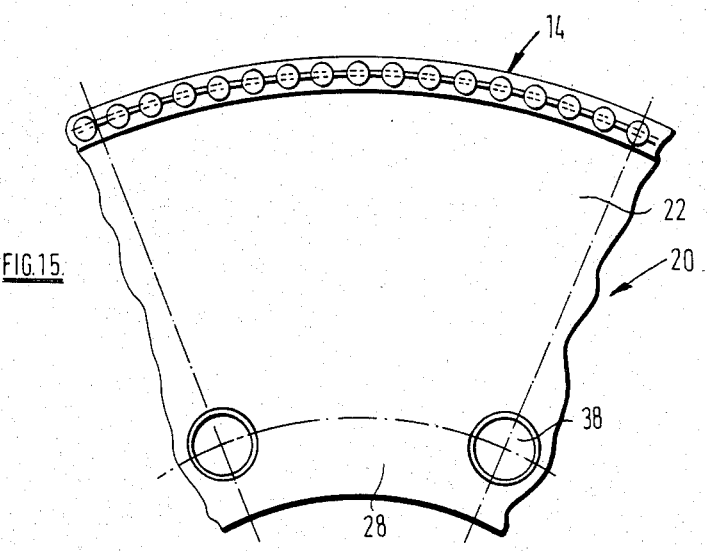
FIG. 15 is an end view of one of the wheel elements of FIG. 14
Figure 14:
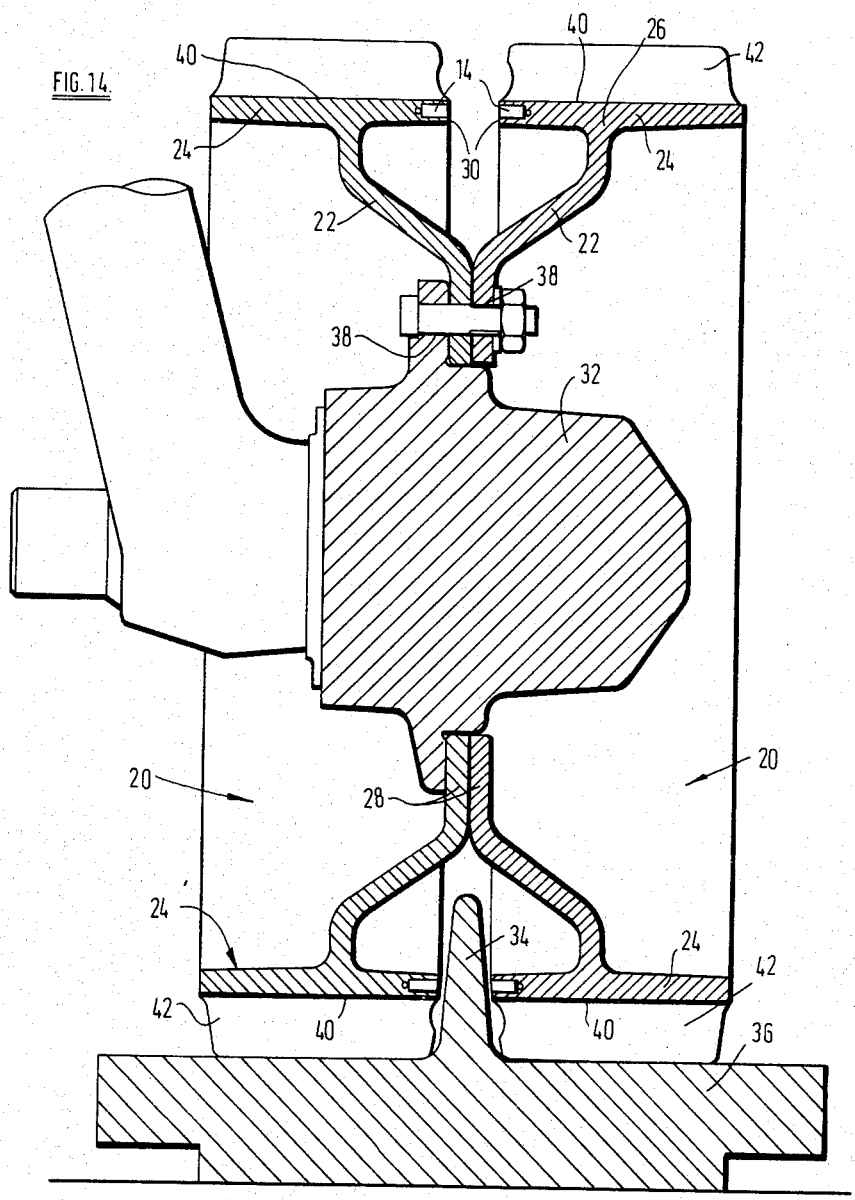
FIG. 14 is a side cross sectional view of a pair of T shaped support wheels for use in a track laying vehicle bolted together and to a hub wherein a set of hard metal studs is incorporated at the inner rim edges
Figure 16:
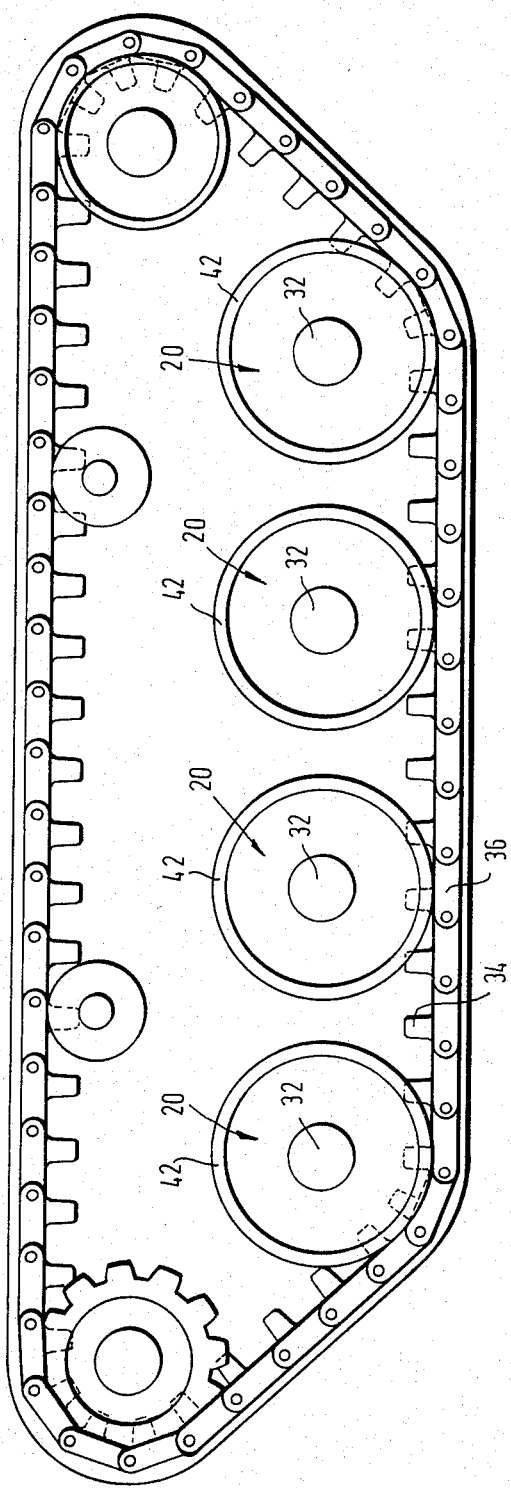
FIG. 16 is a side view of a track assembly in a tracklaying vehicle incorporating support wheels of the type shown in FIGS. 14 and 15.

Referring now to FIGS. 14 to 16, there is shown squeeze formed aluminium wheels 20 with wear-resistant steel studs 14 at the rim edges produced in accordance with the invention as used in a support wheel assembly of a track laying vehicle. Referring particularly to FIGS. 14 and 15, each wheel 20 comprises a dished disc portion 22 and a rim portion 24 wherein the disc merges into the rim substantially in the axially central zone 26 of the rim so that the adjacent portion of the disc and rim together are of T-shape.

The centre portion 28 of the disc 22 extends axially beyond the edge 30 of the rim 24 so that, when a pair of similar wheels 20 are secured to the hub 32, the wheels are in back-to-back configuration and a continuous circumferentially extending groove is defined between the two wheels into which the horns 34 of the track 36 are arranged to extend and to guide the track beneath the wheels. Appropriate bolt holes 38 are formed in the centre portion 28 for securing the two wheels 20 together and also for securing the wheels to a vehicle hub 32.

It will be seen that the hardened steel stud set 14 extends circumferentially around the wheel rim edges 30 between which the track horns 34 project so as to afford the required wear resistance. In the particular arrangement shown in FIGS. 14 and 15 the cylindrical steel studs are spot welded at their rear faces to a single length of steel wire. The single length of steel wire may be of the convoluted form for initial location purposes as previously described with reference to FIGS. 12 and 13 or, alternatively, the single length of steel wire may be non-convoluted and may be initially located in the mould, together with its welded-on studs, by means of circumferentially spaced washers on, for example, every sixth stud.

The provision of studs 14 welded onto a single steel support wire which is convoluted or non-convoluted and which is in accordance with the general constructional principles of the embodiments described with reference to FIGS. 12 and 13 offers many advantages in use. It will be appreciated that a support wheel for a track-laying vehicle is subject to extremely violent wear and impact conditions from the horns of the track. Thus although the re-enforced rim edges 30 on which the track horns 34 bear have to be extremely wear resistant against the continuous "chatter" of the horns it is also necessary that such rim edges 30 are able to offer good impact resistance against the extremely violent impacts from the horns 34 due to the continued predisposition of the horns to jump out of and then re-enter the groove between the rim edges in use.

Steel studs having good weldability, good wear resistance and good impact resistance enable the studs to be securely welded to the length of steel support wire; the wire and the studs then being mechanically locked into the wheel rim edge during the forming of the wheel as previously described. The retention of the studs and wire in the wheel is further enhanced by the inter-metallic bond established between the steel studs, the support wire and the aluminium. The retention of the studs welded onto the support wire enable the studs to resist displacement out of the wheel material during the violent conditions of use referred to above whilst at the same time the studs offer good wear resistance and good impact resistance during such conditions of use.

It will also be seen that the outer peripheral surfaces 40 of the wheel element rims 24 are cylindrical for locating a solid rubber tyre 42 on each rim; the tyre being conveniently moulded in situ on the rim.

Although the foregoing specific description has been with reference to a support wheel for use in a track-laying vehicle, it will be appreciated that the invention, in its broadest terms, envisages the production of squeeze formed articles for any suitable purpose wherein it is desirable to provide a wear resistant area by the incorporation of a set of hard metal wear resistant elements.

We claim:

1. A support wheel for a track-laying vehicle comprising a pair of light metal wheel elements secured together, each wheel element comprising a disc and a rim, the two wheel elements being secured together by their discs thus to provide a continuous groove between the adjacent edges of the rims for accommodating the horns of a track to be supported on said rims, said adjacent rim edges each being provided with reinforcement for resisting wear imparted thereto by the track horns characterised in that the reinforcement at each of said adjacent rim edges comprises a set of circumferentially spaced apart hard metal studs welded onto and supported by a hard metal support wire, all of said studs and their support wire being embedded within the rim edge and bonded to the light metal of which the respective rim is formed.

2. A support wheel as claimed in claim 1 further characterised in that the light metal comprising each said wheel element is aluminium or magnesium or an alloy thereof and that the hard metal comprising the studs and their support wire is steel.

3. A support wheel as claimed in claim 1 further characterised in that each stud is of cylindrical form having its central longitudinal axis substantially parallel to the axis of rotation of the wheel, the studs being welded onto and supported by the support wire at their ends remote from the respective rim edge.

4. A support wheel as claimed in claim 1 further characterised in that the studs are of differing lengths providing a differential wear life to the respective rim edge in which they are embedded.

* * * * *